United States Patent [19]

Winkelmann et al.

[11] 3,922,277
[45] Nov. 25, 1975

[54] (1-ALKYL-5-NITRO-IMIDAZOLYL-2-ALKYL)-PYRIDYL COMPOUNDS

[75] Inventors: Erhardt Winkelmann, Kelkheim, Taunus; Wolfgang Raether, Dreieichenhain, both of Germany

[73] Assignee: Hoechst Aktiengesellschaft, Frankfurt am Main, Germany

[22] Filed: Nov. 14, 1974

[21] Appl. No.: 523,917

[30] Foreign Application Priority Data

Nov. 16, 1973   Germany............................ 2357277

[52] U.S. Cl.... 260/294.8 F; 260/294.8 G; 260/309; 424/263
[51] Int. Cl.[2]........................................ C07D 401/12
[58] Field of Search ............... 260/294.8 G, 294.8 F

[56] References Cited
UNITED STATES PATENTS
3,635,995   1/1972   Manning...................... 260/294.8 G Primary Examiner—Henry R. Jiles
Assistant Examiner—Robert W. Ramsuer
Attorney, Agent, or Firm—Curtis, Morris & Safford

[57] ABSTRACT

(1-Alkyl-5-nitro-imidazolyl-2-alkyl)-pyridyl-sulfides, -sulfoxides and -sulfones of the formula I

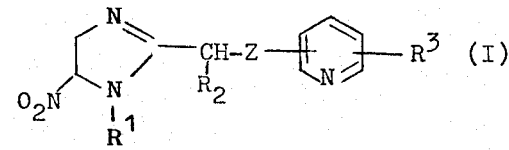

in which $R^1$ represents methyl or ethyl, $R^2$ represents a hydrogen atom or methyl, Z represents a sulfide group (—S—), a sulf-oxide group (—SO—) or a sulfone group (—$SO_2$—), which may be linked with the pyridine ring in the 2-, 3- or 4-position, and in which $R^3$ represents a halogen atom, a cyano or nitro group, and process for preparing them. The compounds are active against trichomonas and amebas.

8 Claims, No Drawings

(1-ALKYL-5-NITRO-IMIDAZOLYL-2-ALKYL)-PYRIDYL COMPOUNDS

The use of 1-(2-hydroxyethyl)-2-methyl-5-nitroimidazole (Metronidazole) in the combat against protozoan diseases such as trichomoniasis and amebiasis is known.

The present invention relates to novel (1-alkyl-5-nitroimidazolyl-2-alkyl)-pyridyl-sulfides, -sulfoxides and -sulfones of the formula I

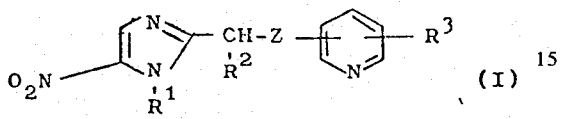

in which $R^1$ represents methyl or ethyl, $R^2$ represents hydrogen or methyl, Z is a sulfur bridge (—S—), a sulfoxide group (—SO—) or a sulfone group (—SO$_2$) and may be linked to the pyridine ring in the 2-, 3- or 4-position and in which $R^3$ is fluorine, chlorine, bromine or iodine, cyano or nitro.

Among the compounds of the formula I, those are preferred in which the substituent $R^3$ is in the 3- or 5-position of the pyridine ring and the substituent Z is in the 2- or 4-position of the pyridine ring.

The invention furthermore relates to a process for preparing the (1-alkyl-5-nitro-imidazolyl-2-alkyl)-pyridyl-sulfides, -sulfoxides and -sulfones of the formula I, which essentially consists in a. reacting a 1-alkyl-2-halogenoalkyl-5-nitro-imidazole of the formula II

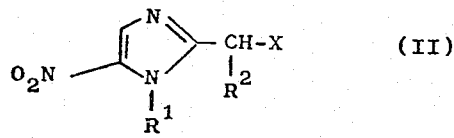

in which $R^1$ and $R^2$ have the meanings given for formula I and X represents halogen or acyloxy, preferably acetoxy, propoxy, butoxy, benzoyloxy, benzyloxy or toly-loxy, or an arylsulfonic acid ester group, preferably a benzene-sulfonic acid ester group, a toluene-sulfonic acid ester group of a naphthalene-sulfonic acid ester group, with a mercaptopyridine or an alkali metal salt or ammonium salt thereof of the formula III

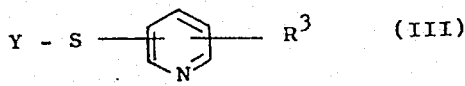

in which $R^3$ has the meaning given for formula I and Y is hydrogen, an alkali metal, in particular sodium or potassium, or ammonium, or b. reacting a 1-alkyl-2-mercaptoalkyl-5-nitro-imidazole of the formula IV

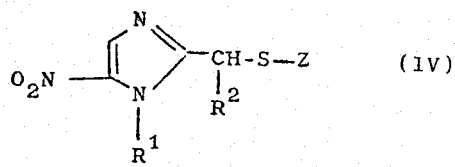

in which $R^1$ and $R^2$ have the meanings given above and Z is hydrogen, an alkali metal, in particular sodium or potassium, ammonium or

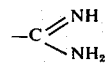

with a halogenopyridine of the formula V $$X \!-\!\!\langle\!\!\!\bigcirc\!\!\!\rangle\!-\! R^3 \qquad (V)$$

in which X and $R^3$ have the meanings given above, and optionally oxidizing the sulfide compound of the formula I so obtained into a sulfoxide or sulfone.

As starting substances of the formula II, there may be used, for example 1-methyl-, 1-ethyl-2-chloro-, -2-bromo-, -2-iodomethyl- or 1-methyl-, 1-ethyl-2-chloro-, -2-bromo-, -2-iodo(1-ethyl)-5-nitro-imidazole, 1-methyl- or 1-ethyl-2-acetoxy-5-nitro-imidazole- or 1-methyl- or 1-ethyl-2-benzene- or -2-toluenesulfonic acid ester.

As starting substances of the formula III, there may be used, for example, 2-mercapto-3-, -4-, -5-, -6-fluoro-, -chloro-, -bromo- or -iodo-pyridine, 2-mercapto-3-, -4-, -5-, -6-cyano- or -nitro-pyridine, 3-mercapto-2-, -4-, -5-, -6-fluoro-, -chloro-, -bromo- or -iodo-pyridine, 4-mercapto-2-, -3-fluoro-, -chloro-, -bromo- or -iodo-pyridine, 4-mercapto-2-, -3-cyano- or -nitropyridine.

Instead of the mentioned mercapto compounds, there may also be used their alkali metal salts or ammonium salts, or mercaptan formers such as the isothiouronium salts.

As starting substances of the formula IV, there may be used, for example, 1-methyl-, 1-ethyl-2-mercaptomethyl- or 1-methyl-, 1-ethyl-2-mercapto-(1-ethyl)-5-nitro-imidazole or the alkali metal salts or ammonium salts thereof, or mercaptan formers such as the isothiouronium salts.

As starting substances of the formula V, there may be used, for example, all the compounds indicated for formula III, in which, however, the mercapto group is replaced by fluorine, chlorine, bromine or iodine, or an acetoxy- or -benzene- or -toluenesulfonic acid ester grouping.

The 1-alkyl-2-chloroalkyl-5-nitro-imidazoles of the formula II used as starting substances are obtained by reaction of 1-alkyl-2-hydroxyalkyl-5-nitro-imidazoles with thionyl chloride, and may then be converted, if desired, into the corresponding fluoro-, bromo- or iodo-compounds by reaction with other metal halides.

The 1-alkyl-2-acyloxy-alkyl-5-nitro-imidazoles or 1-alkyl-2-(arylsulfonyloxyalkyl)-5-nitro-imidazoles of the formula II furthermore used as starting substances are obtained by the reaction of 1-alkyl-2-hydroxyalkyl-5-nitro-imidazoles with an acid anhydride or acide chloride such as acetanhydride or acetyl chloride or with aryl-sulfonic acid chloride such as 4-toluenesulfonic acid chloride.

The mercapto-pyridines of the formula III used as starting substances are obtained from corresponding halogeno-pyridines by the reaction with hydrogen sulfide or, in the case of cyanopyridines, by diazotization of the corresponding amino-cyanopyridines and reaction of the diazonium salt so obtained with alkali metal xanthogenates.

The 1-alkyl-2-mercapto-alkyl-5-nitroimidazoles of the formula IV used as starting substances are obtained from corresponding 2-halogeno-alkylpyridines by the reaction with hydrogen sulfide.

The halogeno-pyridines of the formula V used as starting substances are prepared from corresponding hydroxy compounds with phosphorus halides.

The two variants (a) and (b) of the process of the invention are suitably carried out with equimolar amounts of the respective starting substances, advantageously in a solvent or dispersing agent. If the free mercapto compounds of the formula III or IV are used, it is preferred to work in a polar solvent; If salts of these compounds are used, it is preferred to use non-polar solvents.

As non-polar solvents, there may be used, for example, benzene, toluene, xylene, chloro-benzene. As polar solvents, there may be used, for example alcohols such as methanol, ethanol, propanol, butanol, methoxyethanol or ketones such as acetone, methylethylketone, methylbutyl-ketone, furthermore pyridine, picoline, quinoline, dimethylformamide, dimethylacetamide, N-methylpyrrolidone, tetramethyl-urea, hexamethylphosphoric acid triamide or dimethylsulfoxide.

The reaction temperatures may generally be between 0° and 150° C, preferably between 30° and 100° C. In the case of reactions in polar solvents, the lower temperature ranges are sufficient, while in the case of reactions in non-polar solvents the higher temperatures are more suitable. Depending on the temperature, the reaction tims are in the range of from a few minutes to several hours.

If free mercapto compounds of the formula III and IV are used, it is advisable to apply an acid-binding agent. As acid-binding agents, there may be used bases such as triethylamine or pyridine, and alkali metal and alkaline earth metal carbonates, bicarbonates, hydroxides and alkoxides, for example the -methoxides, -ethoxides and -butoxides.

Isolation of the products of the invention is carried out according to the usual methods by removal by distillation of the solvent used or dilution of the reaction solution with water. The purification may also be carried out by recrystallization from a suitable solvent or mixture of solvents.

The sulfides of the formula I (A = —S—) obtained by one of the described process variants (a) or (b) may be converted into the corresponding sulfoxides (A = —SO—) or sulfones (A = —SO$_2$—) by oxidation.

The oxidations are suitably effected using one- or two-fold amounts of an oxidizing agent. The treatment of the sulfides with one molar equivalent of oxidizing agent yields sulfoxides, the treatment with two molar equivalents yields sulfones. As oxidizing agents, there may be used, for example hydrogen peroxide or peracids, for example per-acetic acid, per-trifluoroacetic acid or metachloro-perbenzoic acid, as well as nitric acid or chromic acid, or the salts thereof, furthermore per-manganates, hypochlorites, perchlorates, periodates and nitrogen oxides.

The oxidation reactions are advantageously carried out in a solvent or dispersing agent.

For this purpose, there are especially suitable those solvents which are not attacked by the oxidizing agent, for example acetic acid, trifluoroacetic acid. If per-benzoic acid is used, there may also be used methylene chloride or chloroform as solvent.

The oxidation reactions which are intended to yield sulfoxides are generally carried out at temperatures between 10° C and 30° C. The sulfones are generally obtained at oxidation temperatures between 50° and 100° C. The sulfonyl compounds may also be prepared by oxidation of the corresponding sulfonyl compounds with the oxidizing agents mentioned for such a purpose at elevated temperature.

Depending on the temperatures used and on the desired final product, the oxidation reaction times are in the range of from a few minutes to several hours.

Isolation of the products of the invention is carried out by dilution of the reaction solution with water and simultaneous precipitation or evaporation of the organic solvent under reduced pressure. Purification may also be carried out by recrystallization from a suitable solvent or mixture of solvents.

The novel compounds of the formula I are well tolerated and active against germs such as bacteria and protozoae. They show an activity against trichomonas and amebae an action which is far superior to that of the known Metronidazole.

Therefore, the novel compounds of the formula I are suitable for combating protozoan diseases in man and animals, for example those provoked by infections by *T. vaginalis* and *E. histolytica*.

The novel compounds may be applied either per-orally or locally. For oral administration, the compounds are applied in general in the form of tablets or capsules which contain, per daily dose, about 10 to 750 mg of the active substance with the usual addition of a diluting and/or extending agent. For local administration, there may be used gels, creams, ointments or suppositories.

The following Examples illustrate the invention.

EXAMPLES 1. 1-Methyl-2-(5-bromopyridyl-2-thiomethyl-)-5-nitro-imidazole 2.3 g (0.1 moles) of metallic sodium were dissolved in small portions in 50 ml of anhydrous methanol. Into this sodium methylate solution, there were introduced 19.0 g (0.1 mole) of 2-mercapto-5-bromo-pyridine, dissolved in 70 ml of anhydrous methanol, and the solution was evaporated under reduced pressure. The residue was combined with a solution of 17.55 g (0.1 mole) of 1-methyl-2-chloromethyl-5-nitro-imidazole in 100 ml of dimethylacetamide and the reaction mixture was heated for 1 hour to 110° C. After cooling, the solution was combined with water until crystallization began. The final product was filtered off and recrystallized from ethanol with addition of charcoal. 26.5 g of 1-methyl-2-(5-bromopyridyl-2-thiomethyl)-5-nitroimidazole (corresponding to 80% of the theory) in the form of yellowish crystals melting at 116° C were obtained. In the same manner, there were obtained with good yields:

2. 1-methyl-2-(5-cyanopyridyl-2-thiomethyl)-5-nitro-imidazole, Fp., 180°C, from 1-methyl-2-chloromethyl-5-nitro-imidazole and 2-mercapto-5-cyanopyridine.

3. 1-methyl-2-(5-nitropyridyl-2-thiomethyl)-5-nitro-imidazole, Fp. 142°C, from 1-methyl-chloromethyl-5-nitro-imidazole and 2-mercapto-5-nitropyridine.

4. 1-ethyl-2-(5-nitropyridyl-2-thiomethyl)-5-nitro-imidazole, Fp. 63°C, from 1-ethyl-2-chloromethyl-5- nitro-imidazole and 2-mercapto-5-nitropyridine.

5. 1-methyl-2-[5-nitropyridyl-2-thio-(1-ethyl)]-5-nitroimidazole, Fp. 59°C, from 1-methyl-2-chloro-(1-ethyl)-5-nitro-imidazole and 2-mercapto-5-nitropyridine.

6. 1-methyl-2-(5-fluoropyridyl-2-thiomethyl)-5-nitro-imidazole
7. 1-methyl-2-(5-chloropyridyl-2-thiomethyl)-5-nitro-imidazole
8. 1-methyl-2-(3-fluoropyridyl-2-thiomethyl)-5-nitro-imidazole
9. 1-methyl-2-(3-chloropyridyl-2-thiomethyl)-5-nitro-imidazole
10. 1-methyl-2-(3-bromopyridyl-2-thiomethyl)-5-nitro-imidazole
11. 1-methyl-2-(3-cyanopyridyl-2-thiomethyl)-5-nitro-imidazole
12. 1-methyl-2-(3-nitropyridyl-2-thiomethyl)-5-nitro-imidazole
13. 1-methyl-2-(5-fluoropyridyl-3-thiomethyl)-5-nitro-imidazole
14. 1-methyl-2-(5-chloropyridyl-3-thiomethyl)-5-nitro-imidazole
15. 1-methyl-2-(5-bromopyridyl-3-thiomethyl)-5-nitro-imidazole
16. 1-methyl-2-(5-cyanopyridyl-3-thiomethyl)-5-nitro-imidazole
17. 1-methyl-2-(5-nitropyridyl-3-thiomethyl)-5-nitro-imidazole
18. 1-methyl-2-(3-fluoropyridyl-4-thiomethyl)-5-nitro-imidazole
19. 1-methyl-2-(3-chloropyridyl-4-thiomethyl)-5-nitro-imidazole
20. 1-methyl-2-(3-bromopyridyl-4-thiomethyl)-5-nitro-imidazole
21. 1-methyl-2-(3-cyanopyridyl-4-thiomethyl)-5-nitro-imidazole
22. 1-methyl-2-(3-nitropyridyl-4-thiomethyl)-5-nitro-imidazole
23. 1-ethyl-2-(5-fluoropyridyl-2-thiomethyl)-5-nitro-imidazole
24. 1-ethyl-2-(5-chloropyridyl-2-thiomethyl)-5-nitro-imidazole
25. 1-ethyl-2-(5-bromopyridyl-2-thiomethyl)-5-nitro-imidazole
26. 1-ethyl-2-(5-cyanopyridyl-2-thiomethyl)-5-nitro-imidazole
27. 1-ethyl-2-(3-fluoropyridyl-2-thiomethyl)-5-nitro-imidazole
28. 1-ethyl-2-(3-chloropyridyl-2-thiomethyl)-5-nitro-imidazole
29. 1-ethyl-2-(3-bromopyridyl-2-thiomethyl)-5-nitro-imidazole
30. 1-ethyl-2-(3-cyanopyridyl)-2-thiomethyl)-5-nitro-imidazole
31. 1-ethyl-2-(3-nitropyridyl-2-thiomethyl)-5-nitro-imidazole
32. 1-ethyl-2-(5-fluoropyridyl-3-thiomethyl)-5-nitro-imidazole
33. 1-ethyl-2-(5-chloropyridyl-3-thiomethyl)-5-nitro-imidazole
34. 1-ethyl-2-(5-bromopyridyl-3-thiomethyl)-5-nitro-imidazole
35. 1-ethyl-2-(5-cyanopyridyl-3-thiomethyl)-5-nitro-imidazole
36. 1-ethyl-2-(5-nitropyridyl-3-thiomethyl)-5-nitro-imidazole
37. 1-ethyl-2-(3-fluoropyridyl-4-thiomethyl-5-nitro-imidazole
38. 1-ethyl-2-(3-chloropyridyl-4-thiomethyl)-5-nitro-imidazole
39. 1-ethyl-2-(3-bromopyridyl-4-thiomethyl)-5-nitro-imidazole
40. 1-ethyl-2-(3-cyanopyridyl-4-thiomethyl)-5-nitro-imidazole
41. 1-ethyl-2-(3-nitropyridyl-4-thiomethyl)-5-nitro-imidazole
42. 1-methyl-2-[5-fluoropyridyl-2-thio-(1-ethyl)]-5-nitro-imidazole
43. 1-methyl-2-[5-chloropyridyl-2-thio-(1-ethyl)]-5-nitro-imidazole
44. 1-methyl-2-[5-bromopyridyl-2-thio-(1-ethyl)]-5-nitro-imidazole
45. 1-methyl-2-[5-cyanopyridyl-2-thio-(1-ethyl)]-5-nitro-imidazole
46. 1-methyl-2-[3-fluoropyridyl-2-thio-(1-ethyl)]-5-nitro-imidazole
47. 1-methyl-2-[3-chloropyridyl-2-thio-(1-ethyl)]-5-nitro-imidazole
48. 1-methyl-2-[3-bromopyridyl-2-thio-(1-ethyl)]-5-nitro-imidazole
49. 1-methyl-2-[3-cyanopyridyl-2-thio-(1-ethyl)]-5-nitro-imidazole
50. 1-methyl-2-[3-nitropyridyl-2-thio(1-ethyl)]-5-nitro-imidazole
51. 1-methyl-2-[5-fluoropyridyl-3-thio-(1-ethyl)]-5-nitro-imidazole
52. 1-methyl-2-[5-chloropyridyl-3-thio-(1-ethyl)]-5-nitro-imidazole
53. 1-methyl-2-[5-bromopyridyl-3-thio-(1-ethyl)]-5-nitro-imidazole
54. 1-methyl-2-[5-cyanopyridyl-3-thio-(1-ethyl)]-5-nitro-imidazole
55. 1-methyl-2-[5-nitropyridyl-3-thio-(1-ethyl)]-5-nitro-imidazole
56. 1-methyl-2-[3-fluoropyridyl-4-thio-(1-ethyl)]-5-nitro-imidazole
57. 1-methyl-2-[3-chloropyridyl-4-thio-(1-ethyl)]-5-nitro-imidazole
58. 1-methyl-2-[3-bromopyridyl-4-thio-(1-ethyl)]-5-nitro-imidazole
59. 1-methyl-2-[3-cyanopyridyl-4-thio-(1-ethyl)]-5-nitro-imidazole
60. 1-methyl-2-[3-nitropyridyl-4-thio-(1-ethyl)]-5-nitro-imidazole
61. 1-Methyl-2-(5-bromopyridyl-2-sulfinyl-methyl)-5-nitro-imidazole 32.9 g (0.1 mole of 1-methyl-2-(5-bromopyridyl-2-thiomethyl)-5-nitroimidazole were dissolved in 200 ml of chloroform and to this solution 17.25 g (0.1 mole) of m-chloroperbenzoic acid dissolved in 450 ml of chloroform were added while stirring at room temperature. The reaction solution was stirred for one hour at room temperature, extracted with dilute soda solution, the chloroform phase was separated, dried over sodium sulfate and evaporated. The residue was recrystallized from alcohol.

25.0 g of 1-methyl-2-(5-bromopyridyl-2-sulfinyl-methyl)-5-nitro-imidazole (corresponding to 72% of the theory) in the form of yellowish crystals melting at 133° C were obtained.

In the same manner, there were obtained from corresponding thio-compounds with good yields:

62. 1-methyl-2-(5-fluoropyridyl-2-sulfinyl-methyl)-5-nitro-imidazole 63. 1-methyl-2-(5-chloropyridyl-2-sulfinyl-methyl)-5-nitro-imidazole
64. 1-ethyl-2-(5-fluoropyridyl-2-sulfinyl-methyl)-5-nitro-imidazole
65. 1-ethyl-2-(5-chloropyridyl-2-sulfinyl-methyl)-5-nitro-imidazole
66. 1-ethyl-2-(5-bromopyridyl-2-sulfinyl-methyl)-5-nitro-imidazole
67. 1-methyl-2-[5-fluoropyridyl-2-sulfinyl-(1-ethyl)]5-nitro-imidazole
68. 1-methyl-2-[5-chloropyridyl-2-sulfinyl-(1-ethyl)]-5-nitro-imidazole
69. 1-methyl-2-[5-bromopyridyl-2-sulfinyl-(1-ethyl)]-5-nitro-imidazole
70. 1-methyl-2-(3-fluoropyridyl-2-sulfinyl-methyl)-5-nitro-imidazole
71. 1-methyl-2-(3-chloropyridyl-2-(3-chloropyridyl-2-sulfinyl-methyl)-5-nitro-imidazole
72. 1-methyl-2-(3-bromopyridyl-2-sulfinyl-methyl)-5-nitro-imidazole
73. 1-methyl-2-(5-fluoropyridyl-3-sulfinyl-methyl)-5-nitro-imidazole
74. 1-methyl-2-(5-chloropyridyl-3-sulfinyl-methyl)-5-nitro-imidazole
75. 1-methyl-2-(5-bromopyridyl-3-sulfinyl-methyl)-5-nitro-imidazole
76. 1-methyl-2-(3-fluoropyridyl-4-sulfinyl-methyl)-5-nitro-imidazole
77. 1-methyl-2-(3-chloropyridyl-4-sulfinyl-methyl)-5-nitro-imidazole
78. 1-methyl-2-(3-bromopyridyl-4-sulfinyl-methyl)-5-nitro-imidazole
79. 1-ethyl-2-(3-fluoropyridyl-2-sulfinyl-methyl)-5-nitro-imidazole
80. 1-ethyl-2-(3-chloropyridyl-2-sulfinyl-methyl)-5-nitro-imidazole
81. 1-ethyl-2-(3-bromopyridyl-2-sulfinyl-methyl)-5-nitro-imidazole
82. 1-ethyl-2-(5-fluoropyridyl-3-sulfinyl-methyl)-5-nitro-imidazole
83. 1-ethyl-2-(5-chloropyridyl-3-sulfinyl-methyl)-5-nitro-imidazole
84. 1-ethyl-2-(5-bromopyridyl-3-sulfinyl-methyl)-5-nitro-imidazole
85. 1-ethyl-2-(3-fluoropyridyl-4-sulfinyl-methyl)-5-nitro-imidazole
86. 1-ethyl-2-(3-chloropyridyl-4-sulfinyl-methyl)-5-nitro-imidazole
87. 1-ethyl-2-(3-bromopyridyl-4-sulfinyl-methyl)-5-nitro-imidazole
88. 1-methyl-2-[3-fluoropyridyl-2-sulfinyl-(1-ethyl)]-5-nitro-imidazole
89. 1-methyl-2-[3-chloropyridyl-2-sulfinyl-(1-ethyl)]-5-nitro-imidazole
90. 1-methyl-2-[3-bromopyridyl-2-sulfinyl-(1-ethyl)]-5-nitro-imidazole
91. 1-methyl-2-[5-fluoropyridyl-3-sulfinyl-(1-ethyl)]-5-nitro-imidazole
92. 1-methyl-2-[5-chloropyridyl-3-sulfinyl-(1-ethyl)]-5-nitro-imidazole
93. 1-methyl-2-[5-bromopyridyl-3-sulfinyl-(1-ethyl)]-5-nitro-imidazole
94. 1-methyl-2-[3-fluoropyridyl-4-sulfinyl-(1-ethyl)]-5-nitro-imidazole
95. 1-methyl-2-[3-chloropyridyl-4-sulfinyl-(1-ethyl)]-5-nitro-imidazole
96. 1-methyl-2-[3-bromopyridyl-4-sulfinyl-(1-ethyl)]-5-nitro-imidazole
97. 1-methyl-2-(5-bromopyridyl-2-sulfonyl-methyl)-5-nitro-imidazole 32.9 g (0.1 mole) of 1-methyl-2-(5-bromopyridyl-2-thiomethyl)-5-nitro-imidazole were dissolved in 400 ml of glacial acetic acid and to this solution, there were added dropwise, while stirring, 20.0 ml (0.2 mole) of 35% hydrogen peroxide at room temperature. No exothermic reaction occurred. The whole was stirred for 2 hours under heating on a steam bath. The reaction solution was concentrated under reduced pressure and the residue was recrystallized from a mixture of water and alcohol.

28.0 g of 1-methyl-2-(5-bromopyridyl-2-sulfonyl-methyl)-5-nitro-imidazole (corresponding to 77 % of the theory) in the form of yellowish crystals melting at 156° C were obtained.

In the same manner, there were obtained from corresponding thio-compounds with good yields:

98. 1-methyl-2-(5-fluoropyridyl-2-sulfonyl-methyl)-5-nitro-imidazole
99. 1-methyl-2-(5-chloropyridyl-2-sulfonyl-methyl)-5-nitro-imidazole
100. 1-ethyl-2-(5-fluoropyridyl-2-sulfonyl-methyl)-5-nitro-imidazole
101. 1-ethyl-2-(5-chloropyridyl-2-sulfonyl-methyl)-5-nitro-imidazole
102. 1-ethyl-2-(5-bromopyridyl-2-sulfonyl-methyl)-5-nitro-imidazole
103. 1-methyl-2-[5fluoropyridyl-2-sulfonyl-(1-ethyl)]-5-nitro-imidazole
104. 1-methyl-2-[5-chloropyridyl-2-sulfonyl(1-ethyl)]-5-nitro-imidazole
105. 1-methyl-2-[5-bromopyridyl-2-sulfonyl-(1-ethyl)]-5-nitro-imidazole
106. 1-methyl-2-(3-fluoropyridyl-2-sulfonyl-methyl)-5-nitro-imidazole
107. 1-methyl-2-(3-chloropyridyl-2-sulfonyl-methyl)-5-nitro-imidazole
108. 1-methyl-2-(3-bromopyridyl-2-sulfonyl-methyl)-5-nitro-imidazole
109. 1-methyl-2-(5-fluoropyridyl-3-sulfonyl-methyl)-5-nitro-imidazole
110. 1-methyl-2-(5-chloropyridyl-3-sulfonyl-methyl)-5-nitro-imidazole
111. 1-methyl-2-(5-bromopyridyl-3-sulfonyl-methyl)-5-nitro-imidazole
112. 1-methyl-2-(3-fluoropyridyl-4-sulfonyl-methyl)-5-nitro-imidazole
113. 1-methyl-2-(3-chloropyridyl-4-sulfonyl-methyl)-5-nitro-imidazole
114. 1-methyl-2-(3-bromopyridyl-4-sulfonyl-methyl)-5-nitro-imidazole
115. 1-ethyl-2-(3-fluoropyridyl-2-sulfonyl-methyl)-5-nitro-imidazole
116. 1-ethyl-2-(3-chloropyridyl-2-sulfonyl-methyl)-5-nitro-imidazole
117. 1-ethyl-2-(3-bromopyridyl-2-sulfonyl-methyl)-5-nitro-imidazole
118. 1-ethyl-2-(5-fluoropyridyl-3-sulfonyl-methyl)-5-nitro-imidazole
119. 1-ethyl-2-(5-chloropyridyl-3-sulfonyl-methyl)-5-nitro-imidazole
120. 1-ethyl-2-(5-bromopyridyl-3-sulfonyl-methyl)-5-nitro-imidazole
121. 1-ethyl-2-(3-fluoropyridyl-4-sulfonyl-methyl)-5-nitro-imidazole
122. 1-ethyl-2-(3-chloropyridyl-4-sulfonyl-methyl)-5-nitro-imidazole 123. 1-ethyl-2-(3-bromopyridyl-4-sulfonyl-methyl)-5-nitro-imidazole
124. 1-methyl-2-[3-fluoropyridyl-2-sulfonyl-(1-ethyl)]-5-nitro-imidazole
125. 1-methyl-2-[3-chloropyridyl-2-sulfonyl-(1-ethyl)]-5-nitro-imidazole
126. 1-methyl-2-[3-bromopyridyl-2-sulfonyl-(1-ethyl)]-5-nitro-imidazole
   1-methyl-2-[5-fluoropyridyl-3-sulfonyl-(1-ethyl)]-5-nitro-imidazole
128. 1-methyl-2-[5-chloropyridyl-3-sulfonyl-(1-ethyl)]-5-nitro-imidazole
129. 1-methyl-2-[5-bromopyridyl-3-sulfonyl-(1-ethyl)]-5-nitro-imidazole
130. 1-methyl-2-[3-fluoropyridyl-4-sulfonyl-(1-ethyl)]-5-nitro-imidazole
131. 1-methyl-2-[3-chloropyridyl-4-sulfonyl-(1-ethyl)]-5-nitro-imidazole
132. 1-methyl-2-[3-bromopyridyl-4-sulfonyl-(1-ethyl)]-5-nitro-imidazole
133.

A solution of 0.92 g of metallic sodium in 25 ml of methanol was introduced, while stirring, within 5 minutes, under an atmosphere of nitrogen at 0° C, into a solution of 5 g of S-(1-methyl-5-nitro-imidazolyl-2-methyl)-isothiouronium chloride (0.02 mole). The whole was stirred for 15 minutes at 0° C. The colour of the solution changed during that time from yellow to light red brown. Then, 3.2 g of 2-chloro-5-nitro-pyridine (0.02 mole) were added. After a short time, a clear solution was formed from which the reaction product crystallized. In order to complete the reaction, the reaction mixture was stirred for 3 hours at 25° C and combined with about 200 ml of ice-water. The crystalline precipitate was filtered off, washed with water and recrystallized from ethanol, optionally with the addition of charcoal.

4.1 g of pale yellow crystals (69.5 % of the theory) of 1-methyl-2-(5-nitropyridyl-2-thiomethyl)-5-nitroimidazole melting at 141° C were obtained.

Analysis: Calc. N 23.7 % S 10.85 %; Found: N 23.5 % S 10.6 %.

We claim:

1. A (1-Alkyl-5-nitro-imidazolyl-2-alkyl)-pyridyl-sulfide, -sulfoxide or -sulfone of the formula I

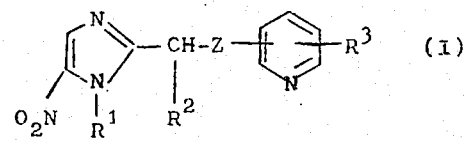

in which $R^1$ represents methyl or ethyl, $R^2$ represents a hydrogen atom or methyl, Z represents a sulfide group (—S—), a sulfoxide group (—SO—) or a sulfone group (—SO$_2$—), which is linked with the pyridine ring in the 2-, 3- or 4-position, and in which $R^3$ represents a halogen atom, a cyano or nitro group.

2. 1-Methyl-2-(5-bromopyridyl-2-thiomethyl-)-5-nitro-imidazole.

3. 1-Methyl-2-(5-cyanopyridyl-2-thiomethyl)-5-nitro-imidazole.

4. 1-Methyl-2-(5-nitropyridyl-2-thiomethyl)-5-nitro-imidazole.

5. 1-Ethyl-2-(5-nitropyridyl-2-thiomethyl)-5-nitro-imidazole.

6. 1-Methyl-2-[5-nitropyridyl-2-thio-(1-ethyl)]-5-nitroimidazole.

7. 1-Methyl-2-(5-bromopyridyl-2-sulfinyl-methyl)-5-nitro-imidazole.

8. 1-Methyl-2-(5-bromopyridyl-2-sulfonyl-methyl)-5-nitro-imidazole.

* * * * *